United States Patent
Checa et al.

[11] Patent Number: 6,002,350
[45] Date of Patent: Dec. 14, 1999

[54] CARGO MOVEMENT DETECTION SYSTEM

[76] Inventors: Humberto Checa; Frank Checa, both of 7885 SW. 18 Ter., Miami, Fla. 33155

[21] Appl. No.: 09/277,360

[22] Filed: Mar. 26, 1999

[51] Int. Cl.[6] ...................................... G01C 21/00
[52] U.S. Cl. ...................... 340/971; 340/673; 340/686.1; 212/276
[58] Field of Search ..................................... 340/971, 571, 340/568.1, 673, 686.1, 686.2, 686.5, 686.6, 691.3; 212/274, 276, 280

[56] References Cited

U.S. PATENT DOCUMENTS

| | | | |
|---|---|---|---|
| 4,932,541 | 6/1990 | Belsterling | 212/191 |
| 5,391,038 | 2/1995 | Stewart | 414/392 |
| 5,760,415 | 6/1998 | Hauck et al. | 250/559.33 |
| 5,819,962 | 10/1998 | Okubo et al. | 272/275 |

*Primary Examiner*—Nina Tong
*Attorney, Agent, or Firm*—J. Sanchelima

[57] ABSTRACT

A system for detecting cargo movement inside a cargo compartment of a craft, such as a plane or vehicle. The cargo is mounted on pallets that in turn are transported within the cargo compartment on rails end kept in place by latch assemblies. An arm assembly is mounted to a fixed convenient location inside the compartment at its distal end attached to a suitable position on the cargo being monitored. At least two parallel arms are pivotally mounted to the fixed position at the distal end. One of the arms to pivotally mounted indirectly through plate members. The plate member pivotally mounted to the fixed end includes a magnetic element that moves in physical proximity to a magnetic field sensor. If the separation exceeds a predetermined magnitude, the sensor generates an output signal that is transmitted to the pilot or driver for the necessary measures to be taken.

7 Claims, 5 Drawing Sheets

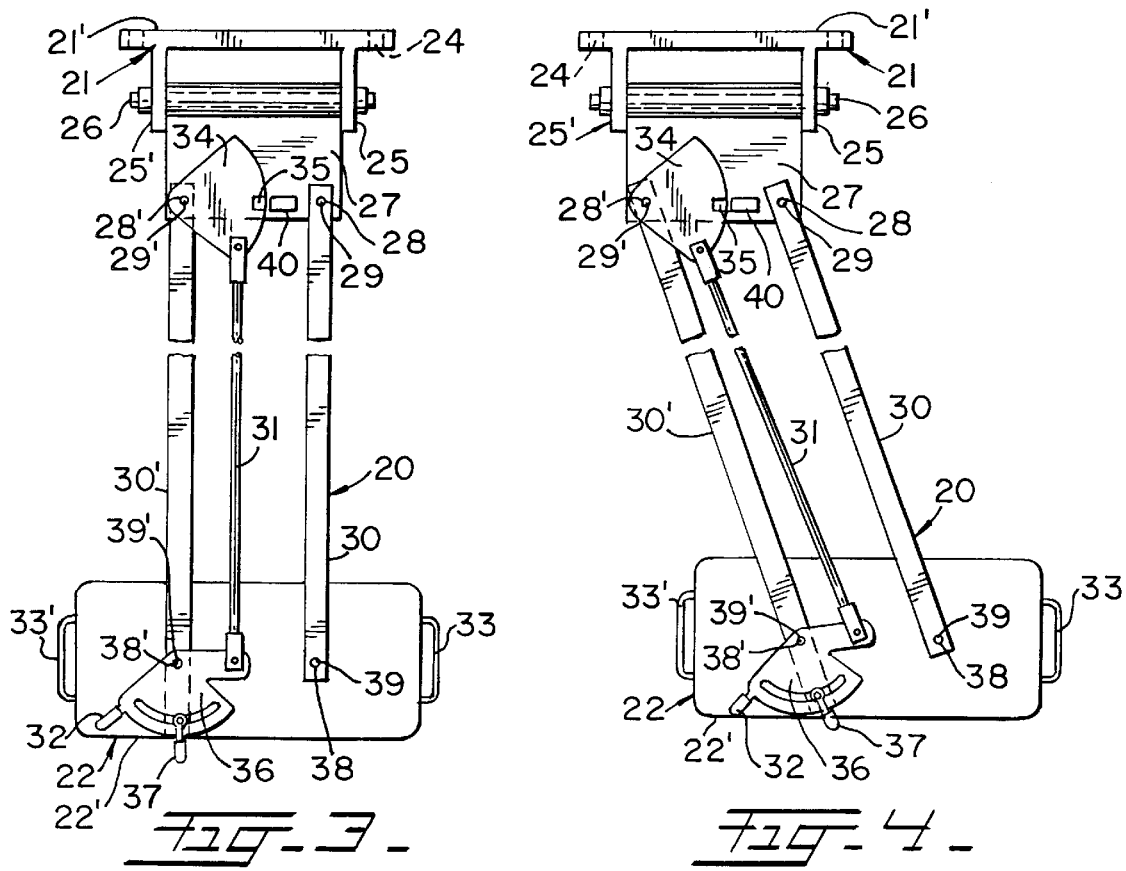
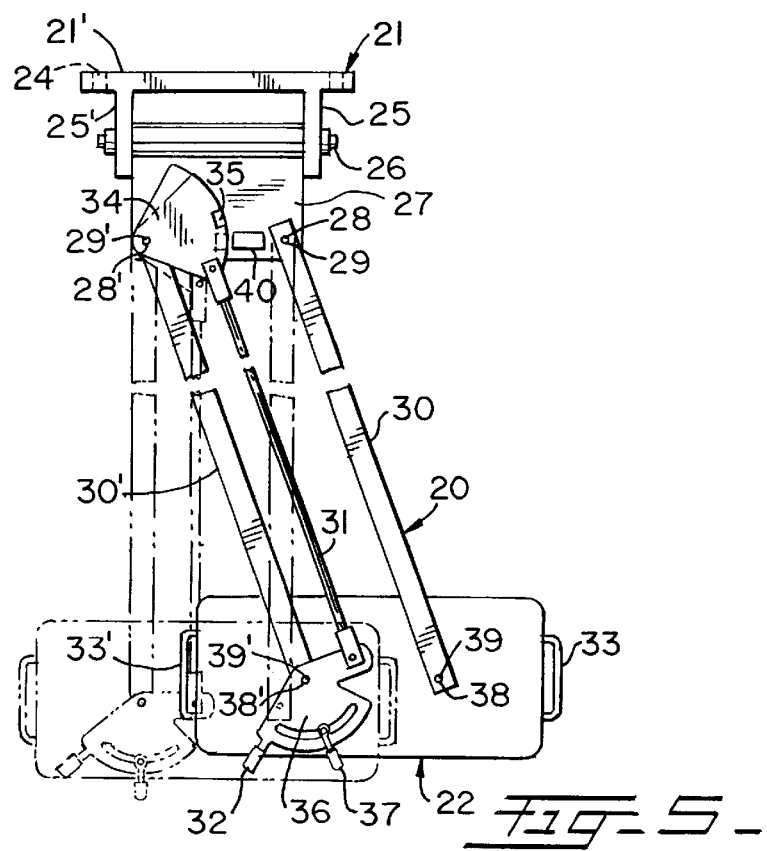

CARGO MOVEMENT DETECTION SYSTEM

BACKGROUND OR THE INVENTION

1. Field of the Invention

The present invention relates to a system for detecting cargo movement in the cargo compartment of a craft.

2. Description of the Related Art

It has been documented that shifts in loads in the cargo compartments of airplanes are the cause of many accidents. These accidents can be prevented if the pilot is given a timely indication of what is happening so that corrective action can be taken. This can be accomplished with a reliable system that alerts the pilot to any movements above a predetermined dangerous level. No other system is known to applicant that can do this.

SUMMARY OF THE INVENTION

It is one of the main objects of the present invention to provide a system for detecting cargo movement, in particular, when the movement is critical to the aircraft transporting the cargo.

It is another object of this invention to provide such a system that can be readily adjusted to detect varying threshold magnitudes of movement to permit a pilot to take the pertinent measures in a timely fashion and ignore inconsequential movements.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a top view of the arm assembly in the stable position.

FIG. 4 is a top view of the arm assembly shown in the previous figure after being mounted to an area of the cargo with the magnet holding assembly adjusted to align the magnet element with the magnet sensor.

FIG. 5 shows the arm assembly being moved from its initial stable position (magnet element aligned with magnet sensor) to a moved (shifted) position activating the magnet sensor.

DETAILED DESCRIPTION OF THE PREFERRED EMBODIMENT

Figure 1:
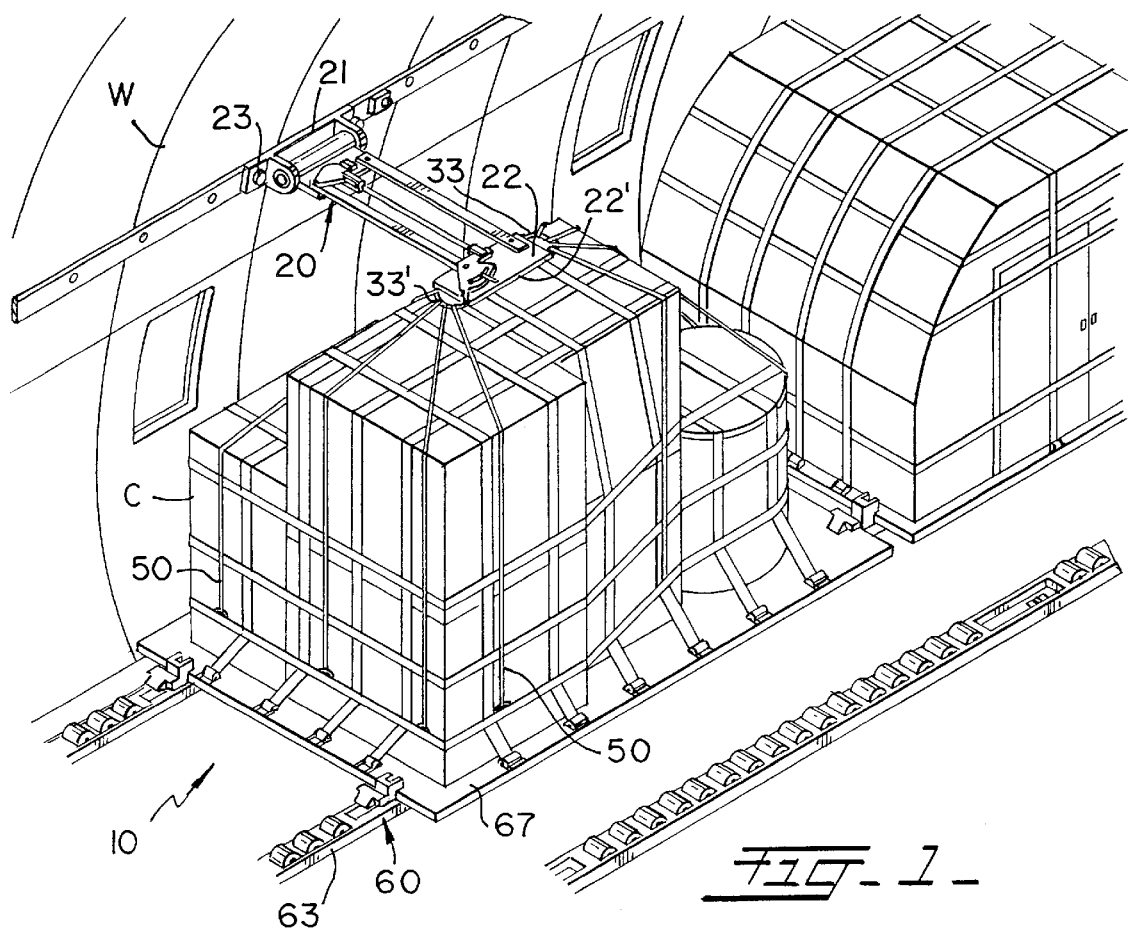
FIG. 1 represents an isometric view of the present invention used in a cargo compartment of a plane.

Referring now to the drawings, where the present invention is generally referred to with numeral 10, it can be observed that it basically includes arm assembly 20 mounted to a fixed location inside a typical plane cargo compartment with the distal end 22' affixed to a point on cargo C being monitored. Rail assembly 60 on which cargo C is mounted on board or pallet members is typically found in cargo compartments of planes.

Figure 2:
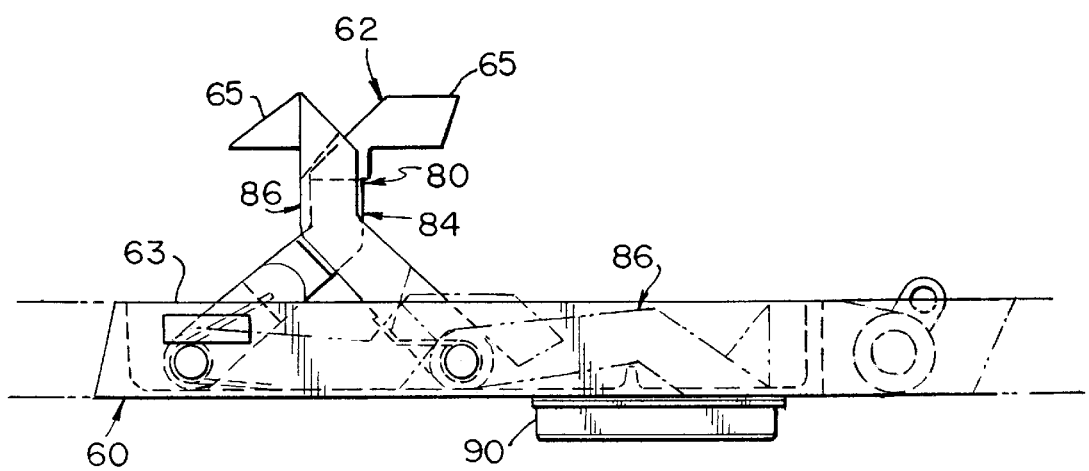
FIG. 2 shows an elevational view of the anchorage or latch assembly used in conjunction with the rail assembly.

FIG. 1 shows in general terms how arm assembly 20 is mounted to interior wall W at a relatively high location. FIG. 2 shows anchorage assembly 62 found in conventional rail assemblies 60 to keep cargo C in place. Anchorage or latch assembly 62 is slidably mounted along rails 63, as seen in FIGS. 1 and 2. Assemblies 62 include fingers 65 that extend substantially horizontally above rail 63 and cooperate with pallet board members 67 over which cargo C rest. Arm assembly 20 includes fixed end 21' which in the preferred embodiment is mounted to interior wall W with fastening member 23, shown in FIG. 1, passing through openings 24, as best seen in FIGS. 3, 4 and 5.

Tying member 22 is, in the preferred embodiment, a plate with a substantially rectangular shape. On the periphery of member 22, C-shaped members 33 and 33' are mounted providing a cooperative structure for tying cords 50, as seen in FIG. 1.

Assembly 20 is best seen in FIGS. 3 and 4, at two positions. Assembly 20 also includes distal end 22'. Plates 25 and 25' are perpendicularly and rigidly mounted to support assembly 21 and kept at a spaced apart relationship to each other hold axle 26 in between. Base plate member 27 is journaled around axle 26 permitting the former to pivot about the latter. The distal end of base plate member 27 includes openings 28 and 28' through which pivoting pins 29 and 29' are passed permitting arm members 30 and 30' to pivot about pins 29 and 29'. The other ends of members 30 and 30' include through openings 38 and 38', respectively, that with pin members 39 and 39' permit these other ends of members 30 and 30' to pivot.

Arm member 30' (and it may have also been arm member 30) includes magnet holding plate 34 pivotally mounted to pin 29', as seen in FIGS. 3 and 4. Magnet element 35 is mounted at the edge of plate 34 to achieve maximum linear movement for a given angular rotation. The other end of arm member 30 includes locking plate 36 that includes locking mechanism 37. Mechanism 37 permits a user to lock plate 36 at a particular fixed position with respect to arm 30'. Handle 32 is provided to facilitate the angular movement of plate 36. Thus, tying assembly 22 will have some flexibility as to where on cargo C (typically with irregular shapes) will be positioned. If arms 30 and 30' do not extend perpendicularly then the pertinent adjustment can be made, as shown in FIG. 4.

When setting tying member 22 against cargo C, cords 50 are passed through C-shaped members 33 and 33' and suitable structural members on cargo C. Arm assembly 20 will not end up looking like what is represented in FIG. 3 necessarily. A user may end up with arm assembly 20 in a position similar to the one represented in FIG. 4. Therefore, an adjustment is necessary. This is accomplished by rotating locking plate 36 sufficiently to cause magnet element 35 to be aligned with magnet sensor 40. This will then be the "stable" position for arm assembly 20.

FIG. 5 shows the moved position of assembly 20 which includes tying member 22 at its distal end. Arm member 31 is pivotally mounted to plates 34 and 36 so that any movements of tying member 22 is transmitted to plate 34. The angular movement experienced by tying member 22 is transmitted through plate 36 and arm member 31 to plate 34 and if the angular movement of the latter is sufficient to affect the alignment of magnet element 35 with magnet sensor 40, the latter is activated producing an electrical signal output that is transmitted to the pilot's cockpit instruments.

Figures 6A, 6B, 6C:
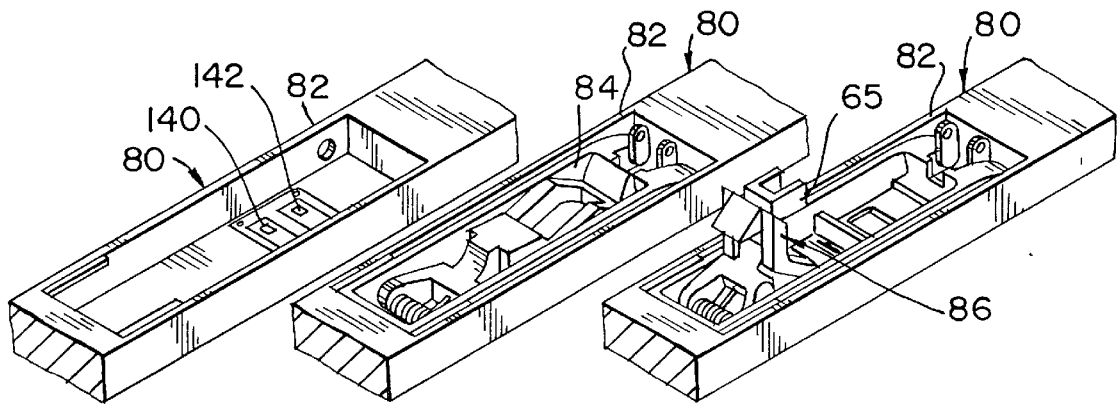
FIGS. 6a; 6b; 6c show the latch assembly housing by itself, with the latching mechanism and with the gripping member installed, respectively.

FIGS. 6a; 6b and 6c show the details of latching assembly 80. FIG. 6a shows housing 82 empty with Hall effect sensors 140 and 142 mounted on the bottom. FIG. 6b has latching mechanism 84 mounted inside housing 82. FIG. 6c shows gripping member 86 used to hold cargo C in place along rail assembly 60.

Figure 7:
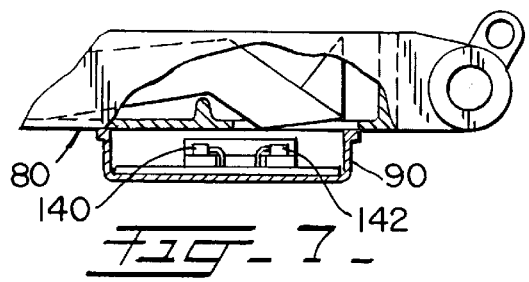
FIG. 7 is a cross section of the sensors' housing.

FIGS. 7; 8 and 9 show sensor housing 90 wherein sensors 140 and 142 are housed. Housing 90 is cooperatively positioned below latching assembly 80.

Figure 10:
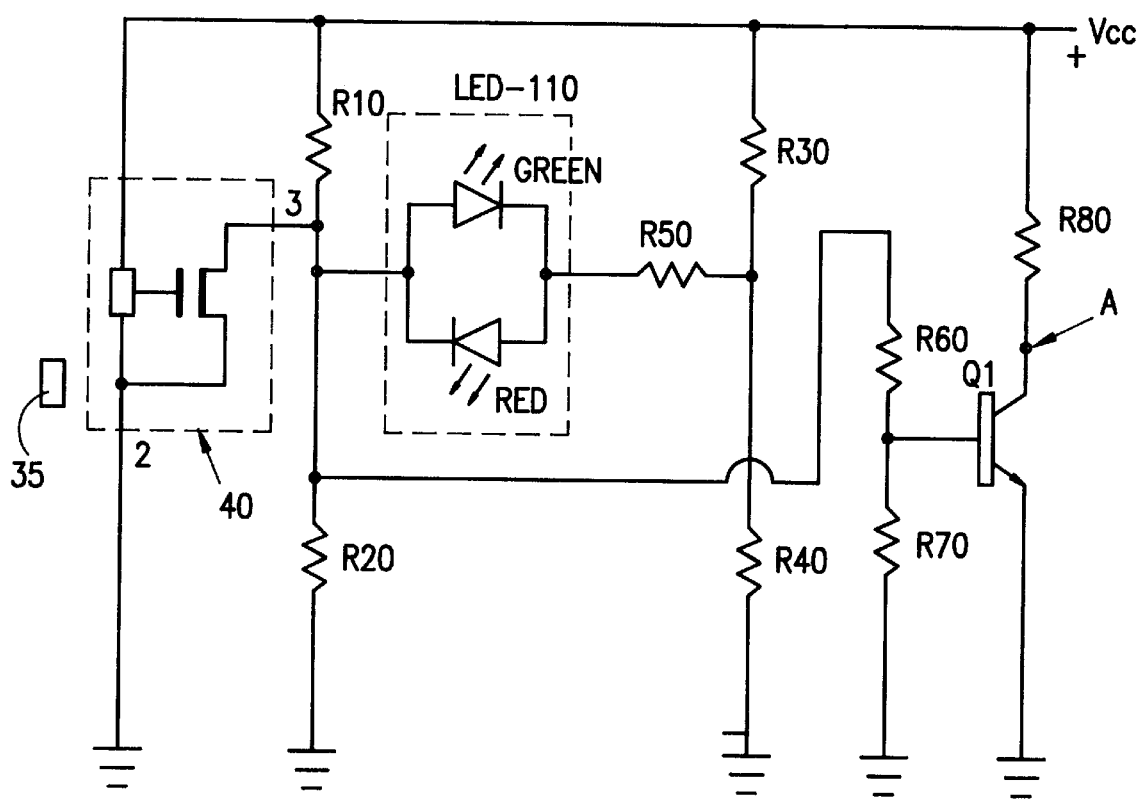
FIG. 10 represents the electronic circuit for detecting an abnormal displacement of cargo load used in one of the preferred embodiments with the arm assembly.

Magnet sensor 40 may be implemented with a reed relay, Hall effect sensor, or equivalent, and one of the preferred embodiment is shown in FIG. 10.

FIG. 10 shows a circuit used in conjunction with arm assembly 20 wherein a Hall effect sensors can be used to implement a device that produces electrical output when the movement of the cargo exceeds a predetermined magnitude.

Figure 11:
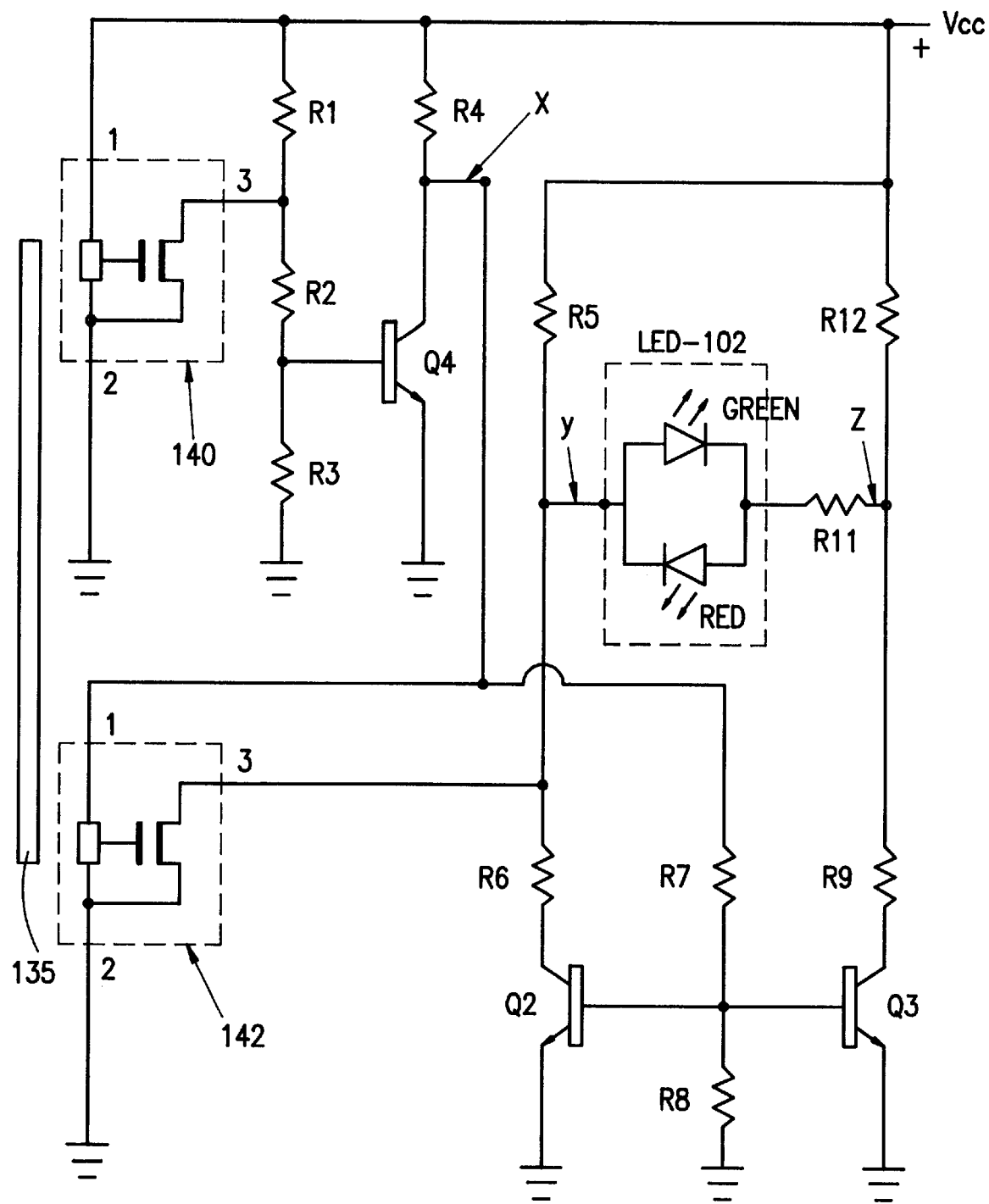
FIG. 11 represents the electronic circuit for sensing three different latch states.

As it can be seen in FIG. 11, Hall effect sensors 140 and 142 can be used to implement a magnetic sensing device that generates an electrical output when a magnetic element is within or outside a predetermined distance. This electrical output can then be translated to a visual or aural alarm. The magnetic sensing device is mounted on the latching mechanism that keeps the pallets in place. A magnetic element is mounted on the movable component of the latch.

The circuit on FIG. 10 senses a misalignment between magnet 35 and sensor 40 when a displacement above a predetermined magnitude has been detected on cargo C where tying member 22 has been installed.

State 1: Arm Aligned. (Green LED energized) State 2: Arm out of alignment caused by cargo movement (after initial alignment). (Red LED energized).

For state 1 arm assembly is installed and adjusted to align the magnet element with the Hall effect magnetic sensor.

The magnetic flux on the marking side of sensor 40 turns the output collector to a low reading, unbalancing the Weston bridge circuit composed by resistors R10, R20, R30, and R40.

The difference on the potential between the R10–R20 junction and the R30–R40 junction will flow through current limiting resistor R50 to light up LED-110 on Green, showing that the arm is aligned in place.

For state 2 a displacement of the load is detected by movement of tying member 22.

Magnetic flux is removed from the sensor 40 or its intensity is not enough to activate it. The collector output of sensor 40 goes high. Voltage at the junction of R10–R20 will be higher than the voltage at the junction of R30–R40 causing the red LED-110 to turn on to alert that the cargo load had been displaced more than normal.

$$\frac{R10}{R_{10}+R_{20}} < \frac{R30}{R_{30}+R_{40}}$$

Also, when the collector output of sensor 40 goes high, R60 and R70 will provide the bias to turn transistor Q1 on, changing the output from high to low. This collector output is the logic output. R80 limit the current delivery at the logic output A.

A is a logic output used to send data to remote display units in the aircraft cockpit.

The circuit on FIG. 11 senses three different states for latch in assembly 80.

State 1: Latching assembly 80 not in place. (LED OFF).

State 2: Latching assembly 80 in place with gripping member 86 down. (Red LED ON).

State 3: Latch in place with latching mechanism raised and in locked position. (Green LED ON).

The different states of latching assembly 80 are also monitored by the pilot. This monitoring is implemented in the preferred embodiment with the circuit represented in FIG. 11.

Two Hall effect sensors (140 and 142) are positioned in a way that a north pole of the magnet 135 will bias the sensor from the opposite side of the marking surfaces. This arrangement permits a maximum sensitivity for the sensors on the marking surface that will detect and complete the magnetic flux when the metallic latch assembly 80 is locked turning on sensor 140, and when the latch is raised activating sensor 142.

With respect to the circuit shown in FIG. 11, Q4 is a NPN silicone switching transistor. R4 provides collector working voltage, R1 provides voltage to the open collector output of the sensor 140. R2 and R3 provide bias voltage for base of Q4.

In state 1, that is, no latch assembly 80 in place, Q4 is ON due to R1, R2, R3 voltage divider that bias the transistor at 0.7 volts. Collector output X is low (voltage near zero volts in saturation). With this condition, sensor 142 will not have operating voltage (Pin 1) and switching transistors Q2 and Q3 will be OFF. R7 and R8 make a voltage divider that provides bias for both transistor bases. Since, at this stage, Q4 is ON and collector voltage is low, there will be zero voltage for both Q2 and Q3 base.

Resistors R5, R6, R9, R12 and transistors Q2 and Q3 form a Weston bridge circuit. At state 1, Q2 and Q3 are OFF, the negative side of the bridge (R6 and R9) is open and there will be no voltage between points Y and Z and LED-102 will be OFF showing no latch in place condition.

State 2 corresponds to setting gripping members 86 after assembly 80 is placed on the rail.

The metal gripping members 86 complete the magnetic flux flow through sensor 140. Collector output of the sensor will change from high to low, removing bias on transistor Q4; changing the collector output from low to high; now, R4 will provide working voltage to sensor 142 and R7 will have voltage that will be applied to the bases of Q2 and Q3, turning both ON, completing the Weston bridge circuit to the negative side of the working voltage; and, since the latching arm is down, a magnetic flux will energize sensor 142, changing the collector output from high to low. The connection from collector to voltage divider R5 and R6 is part of the Weston bridge. The condition low on sensor 142 collector, will develop a voltage difference between X and Y that will be applied through current limiting resistor R11 to LED-102. Voltage polarity on the LED-102 will turn LED ON (Red), at this time, showing state 2 (griping members 86 in place) but not securing loaded pallet. The values of the resistors will respond to the following formula:

$$\frac{R5}{R_5 + R_6} < \frac{R12}{R_9 + R_{12}}$$

In state 3 the latching mechanism 84 is raised to secure a pallet, magnetic flux is removed from sensor 142. Sensor 142 collector output will change to high, voltage will increase at R6 resistor, unbalancing the bridge and reversing the polarity between X and Y. This condition will energize the green LED-102 to show a latch is in place and latching mechanism is raised and in locked position.

Outputs X, Y, and Z are logic outputs to be used to send data info to the remote display unit at the aircraft cockpit.

Figure 8:
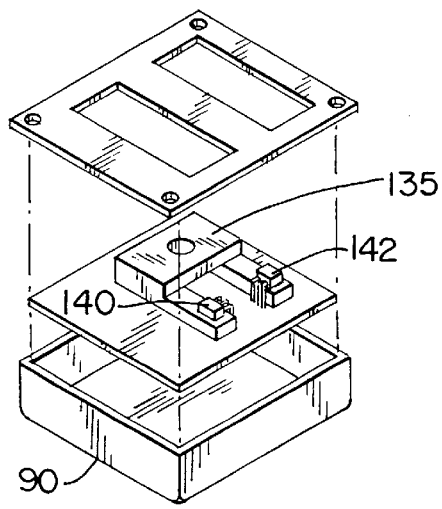
FIG. 8 is an isometric exploded view of the sensors' housing.
Figure 9:
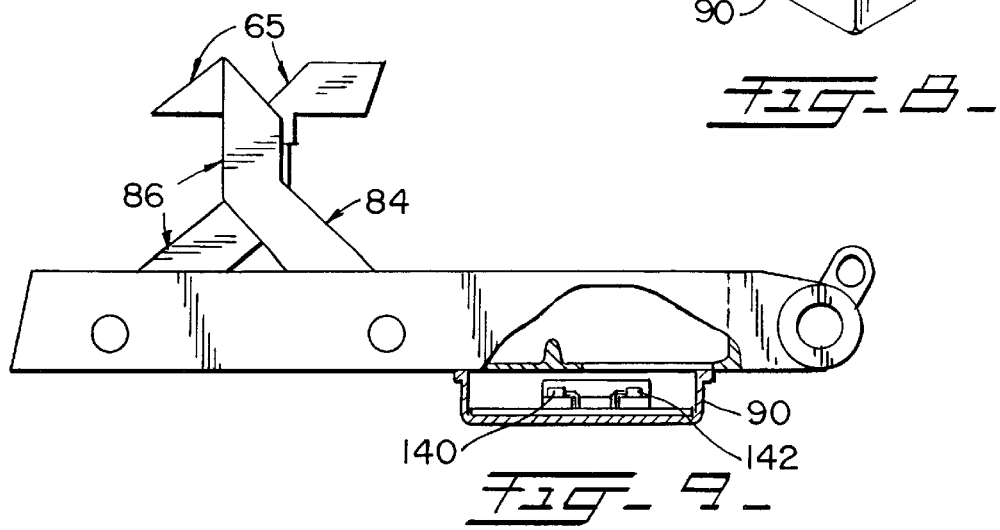
FIG. 9 is an elevational view of the latch assembly with a partial cross-sectional view of the sensors' housing.

Sensor housing 90 shows in FIGS. 7, 8, and 9 houses Hall effect sensors 140 and 142, cooperatively positioned adjacent to and below latching assembly 80. Depending on the state (present, latched or unlatched) of assembly 80, sensors 140 and 142 are activated or not.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

We claim:

1. A system for detecting cargo movement inside a compartment of a moving craft that includes an interior wall, comprising:

A) a rail assembly having pallets sliceably mounted thereon and further including latching means for keeping said pallets at predetermined positions along said rail assembly; and B) an arm assembly having first and second ends, said first end including supporting means for pivotally mounting said arm assembly to a cooperatively pre-selected position on said interior wall, and said second end including a means for mounting said second end to cargo loaded on said pallets so that movements of the latter are transmitted to said second end, and further including means for sensing the movement of said second end and means for generating an electrical output signal once said movement exceeds a predetermined magnitude.

2. The system set forth in claim 1 wherein said means for sensing the movement of said second end includes a magnetic element that moves in proportion with the movement of said second end and a magnetic field sensor mounted in physical proximity to said magnetic element so that after a predetermined magnitude of movement the separation of said magnetic element from said magnetic field sensor causes the latter to generate said electrical output signal.

3. The system set forth in claim 2 wherein said arm assembly includes a first arm member, with third and forth ends, said third end being pivotally mounted to said means for mounting said second ends to said cargo, and further including a first plate assembly pivotally mounted to said supporting means and said first plate having said magnetic element mounted thereon, and a second plate assembly being pivotally mounted to said means for mounting said second ends to said cargo, and further including a second arm member having fifth and sixth ends, said fifth end being pivotally mounted to said first plate member at a predetermined distance away from the pivoting part of said first plate with said supporting means, and said sixth end being pivotally mounted to said second plate at a predetermined distance away from the pivoting point of said second plate on said means for mounting said second end to said cargo so that a movement of said second end is transmitted to said magnetic element.

4. The system set forth in claim 3 further including means for adjusting said magnetic element into alignment with said magnetic field sensor over a range of predetermined positions of said second end.

5. The system set forth in claim 4 wherein said means for adjusting includes locking means to keep said second plate at a predetermined position.

6. The system set forth in claim 5 wherein said magnetic field sensor includes a Hall effect sensor that is biased to conduct when said magnetic element is within a predetermined distance and further including luminous means that are activated to show this condition and an alarm when said magnetic element is not within said predetermined distance.

7. The system set forth in claim 6 wherein said latching means includes a magnetic field sensor that is mounted thereon and a magnetic element mounted on said latching means so that when said latching means is set said magnetic element is brought in close proximity with respect to said magnetic field sensor generating an electrical output.

\* \* \* \* \*